United States Patent
Yang et al.

(10) Patent No.: US 11,402,918 B2
(45) Date of Patent: Aug. 2, 2022

(54) METHOD FOR CONTROLLING TERMINAL APPARATUS, APPARATUS FOR CONTROLLING TERMINAL APPARATUS, AND COMPUTER-PROGRAM PRODUCT

(71) Applicant: BOE Technology Group Co., Ltd., Beijing (CN)

(72) Inventors: Quan Yang, Beijing (CN); Hongrun Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 780 days.

(21) Appl. No.: 16/333,985

(22) PCT Filed: Oct. 11, 2018

(86) PCT No.: PCT/CN2018/109816
§ 371 (c)(1),
(2) Date: Mar. 15, 2019

(87) PCT Pub. No.: WO2019/076230
PCT Pub. Date: Apr. 25, 2019

(65) Prior Publication Data
US 2021/0325971 A1   Oct. 21, 2021

(30) Foreign Application Priority Data
Oct. 19, 2017  (CN) .......................... 201710980330.5

(51) Int. Cl.
*G06F 3/01* (2006.01)
*G06T 7/73* (2017.01)
(Continued)

(52) U.S. Cl.
CPC ............... *G06F 3/017* (2013.01); *G06T 5/30* (2013.01); *G06T 7/13* (2017.01); *G06T 7/73* (2017.01);
(Continued)

(58) Field of Classification Search
None
See application file for complete search history.

(56) References Cited

U.S. PATENT DOCUMENTS

| 2010/0194679 A1* | 8/2010 | Wu ...................... G06V 40/107 382/165 |
| 2011/0234840 A1* | 9/2011 | Klefenz ............... G06V 40/107 348/222.1 |

(Continued)

FOREIGN PATENT DOCUMENTS

| CN | 200973160 Y | 11/2007 |
| CN | 101193286 A | 6/2008 |

(Continued)

OTHER PUBLICATIONS

Ito et al.; "Fast Ellipse Detection Algorithm using Hough Transform on the GPU;" IEEE Computer Society; 2011 Second International Conference on Networking and Computing; pp. 313-319 (Year: 2011).*

(Continued)

*Primary Examiner* — Edward Martello
(74) *Attorney, Agent, or Firm* — Intellectual Valley Law, P.C.

(57) ABSTRACT

A method for controlling a terminal apparatus includes acquiring a first gesture image; determining a central coordinate of a gesture in the first gesture image; determining a controlling range in which the gesture has control over the terminal apparatus, based on the central coordinate of the gesture in the first gesture image; and controlling a control object in the controlling range to execute an operation based on a control instruction corresponding to the gesture.

20 Claims, 5 Drawing Sheets

(51) Int. Cl.
*G06T 7/13* (2017.01)
*G06T 5/30* (2006.01)
*G06V 10/20* (2022.01)
*G06V 10/28* (2022.01)
*G06V 10/30* (2022.01)
*G06V 10/44* (2022.01)
*G06V 40/10* (2022.01)

(52) U.S. Cl.
CPC ............ *G06V 10/20* (2022.01); *G06V 10/28* (2022.01); *G06V 10/30* (2022.01); *G06V 10/457* (2022.01); *G06V 40/113* (2022.01); *G06T 2207/10024* (2013.01); *G06T 2207/20132* (2013.01); *G06T 2207/30196* (2013.01)

(56) References Cited

U.S. PATENT DOCUMENTS

| | | | |
|---|---|---|---|
| 2012/0069168 A1 | 3/2012 | Huang et al. | |
| 2015/0169072 A1 | 6/2015 | Wei et al. | |
| 2015/0193656 A1* | 7/2015 | Kounavis | G06V 10/449 382/165 |
| 2016/0124513 A1* | 5/2016 | Dal Zot | G06F 3/011 715/863 |
| 2017/0109936 A1* | 4/2017 | Powderly | G06F 3/013 |
| 2019/0005733 A1* | 1/2019 | Wehner | G06F 3/017 |
| 2019/0034076 A1* | 1/2019 | Vinayak | G06T 19/20 |

FOREIGN PATENT DOCUMENTS

| | | |
|---|---|---|
| CN | 101334263 A | 12/2008 |
| CN | 101359367 A | 2/2009 |
| CN | 101739122 A | 6/2010 |
| CN | 102521567 A | 6/2012 |
| CN | 103098076 A | 5/2013 |
| CN | 103208002 A | 7/2013 |
| CN | 103226387 A | 7/2013 |
| CN | 103399699 A | 11/2013 |
| CN | 103971102 A | 8/2014 |
| CN | 104407694 A | 3/2015 |
| CN | 104714637 A | 6/2015 |
| CN | 104981105 A | 10/2015 |
| CN | 105138122 A | 12/2015 |
| CN | 105787471 A | 7/2016 |
| CN | 106598356 A | 4/2017 |

OTHER PUBLICATIONS

First Office Action in the Chinese Patent Application No. 201710980330.5, dated May 26, 2020; English translation attached.
International Search Report & Written Opinion dated Jan. 21, 2019, regarding PCT/CN2018/109816.

* cited by examiner

| $5_{pixel}$ | $1_{pixel}$ | $6_{pixel}$ |
|---|---|---|
| $3_{pixel}$ | Now | $4_{pixel}$ |
| $7_{pixel}$ | $2_{pixel}$ | $8_{pixel}$ |

METHOD FOR CONTROLLING TERMINAL APPARATUS, APPARATUS FOR CONTROLLING TERMINAL APPARATUS, AND COMPUTER-PROGRAM PRODUCT

CROSS-REFERENCE TO RELATED APPLICATION

This application is a national stage application under 35 U.S.C. § 371 of International Application No. PCT/CN2018/109816, filed Oct. 11, 2018, which claims priority to Chinese Patent Application No. 201710980330.5, filed Oct. 19, 2017, the contents of which are incorporated by reference in the entirety.

TECHNICAL FIELD

The present invention relates to image recognition technology, more particularly, to a method for controlling a terminal apparatus, an apparatus for controlling a terminal apparatus, and a computer-program product.

BACKGROUND

At present, a user may interact with electronic apparatuses such as TVs, computers, mobile phones, using various means such as buttons on TVs, remote controls, keyboards, voice control, touch control, gesture recognition, and eye tracking.

SUMMARY

In one aspect, the present invention provides a method for controlling a terminal apparatus, comprising acquiring a first gesture image; determining a central coordinate of a gesture in the first gesture image; determining a controlling range in which the gesture has control over the terminal apparatus, based on the central coordinate of the gesture in the first gesture image; and controlling a control object in the controlling range to execute an operation based on a control instruction corresponding to the gesture.

Optionally, determining the central coordinate of the gesture in the first gesture image comprises processing the first gesture image to obtain a binary image of the gesture; and determining the central coordinate of the gesture in the first gesture image based on edge pixels of a gesture edge in the binary image.

Optionally, determining the central coordinate of the gesture in the first gesture image based on edge pixels of the gesture edge in the binary image comprises extracting a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and one of the plurality of first rows of pixels that is immediately adjacent to the initial row of pixel; and fitting the initial edge pixel and the plurality of first edge pixels to derive the central coordinate of the gesture in the first gesture image.

Optionally, prior to determining the central coordinate of the gesture in the first, gesture image based on edge pixels of the gesture edge in the binary image, the method further comprises recognizing a first connected domain in the binary image; and determining edge pixels of the first connected domain; wherein the edge pixels of the first connected domain are used as the edge pixels of the gesture edge for determining the central coordinate of the gesture in the first gesture image.

Optionally, recognizing the first connected domain in the binary image comprises evaluating whether a present pixel is an edge pixel for pixels in the binary image one-by-one until all edge pixels in the binary image are identified; recognizing one or more second connected domains based on a plurality of consecutively connected edge pixels from the edge pixels recognized in the binary image; and assigning a connected domain having a largest area out of the one or more second connected domains as the first connected domain for determining the central coordinate of the gesture in the first gesture image.

Optionally, evaluating whether the present pixel is the edge pixel comprises: acquiring pixel values of a plurality of pixels adjacent to the present pixel; and determining whether the present pixel is the edge pixel based on the pixel values of the plurality of pixels adjacent to the present pixel; wherein the present pixel is determined not to be the edge pixel if each of the pixel values of the plurality of pixels adjacent to the present pixel is a first pixel value; and the present pixel is determined to be the edge pixel if at least one of the pixel values of the plurality of pixels adjacent to the present pixel is not the first pixel value.

Optionally, prior to determining the central coordinate of the gesture in the first gesture image, the method further comprises scanning the binary image to identify one or more noise rows from a plurality of rows of pixels; and deleting the one or more noise rows from the binary image.

Optionally, scanning the binary image to identify the one or more noise rows from the plurality of rows of pixels comprises scanning the binary image extract a plurality of first pixels in the binary image, each of which has a first pixel value; polling a total number of first pixels of the plurality of first pixels in a present row of the plurality of rows of pixels, based on positions of the plurality of first pixels in the binary image; and assigning the present row of the plurality of rows of pixels as a noise row of the one or more noise rows based on a determination that the total number of first pixels of the plurality of first pixels in the present row of the plurality of rows of pixels is less than a threshold value.

Optionally, determining the central coordinate of the gesture in the first gesture image comprises processing the first gesture image to obtain a binary image of the gesture; recognizing one or more finger domains in the binary image, and caching data of the one or more finger domains in a memory; and determining, the central coordinate of the gesture in the first gesture image based on the one or more finger domains.

Optionally, determining the central coordinate of the gesture in the first gesture image based on the one or more finger domains comprises accumulating pixel values of each row of pixels in each of the one or more finger domains to obtain multiple accumulated row pixel values for each of the one or more finger domains; accumulating pixel values of each column of pixels in each of the one or more finger domains to obtain multiple accumulated column pixel values for each of the one or more finger domains; determining a first maximum accumulated pixel value from a plurality of first accumulated pixel values comprising the multiple accumulated row pixel values for each of the one or more finger domains; determining a second maximum accumulated pixel value from a plurality of second accumulated pixel values comprising the multiple accumulated column pixel values for each of the one or more finger domains; and determining the central coordinate of the gesture in the first gesture image based on a row corresponding to the first maximum accumulated pixel value and a column corresponding to the second maximum accumulated pixel value.

Optionally, caching the data of the one or more finger domains in the memory comprises caching data of selected rows of the one or more finger domains.

Optionally, processing the first gesture image to obtain the binary image of the gesture comprises cropping the first gesture image to a first size to obtain a second gesture image, the first gesture image and the second gesture image being color images; performing gradation conversion on the second gesture image to obtain a first grayscale gesture image; filtering the first grayscale gesture image to obtain a second grayscale gesture image; determining pixel values of pixels in the second grayscale gesture image; comparing a pixel value of each pixel in the second grayscale gesture image with a threshold pixel value; assigning pixels having pixel values greater than or equal to the threshold pixel value as a plurality of first pixels, each of which assigned a first pixel value, and pixels having pixel values less than the threshold pixel value as a plurality of second pixels, each of which assigned a second pixel value, thereby obtaining an intermediate binary image; and performing a boundary erosion and expansion operation on the intermediate binary image thereby obtaining the binary image of the gesture.

In another aspect, the present invention provides an apparatus for controlling a terminal apparatus, comprising a memory; and one or more processors; wherein the memory and the one or mare processors are connected with each other; and the memory stores computer-executable instructions for controlling the one or more processors to acquire a first gesture image; determine a central coordinate of a gesture in the first gesture image; determine a controlling range in which the gesture has control over the terminal apparatus, based on the central coordinate of the gesture in the first gesture image; and control a control object in the controlling range to execute an operation based on a control instruction corresponding to the gesture.

Optionally, the memory further stores computer-executable instructions for controlling the one or more processors to process the first gesture image to obtain a binary image of the gesture; and determine the central coordinate of the gesture in the first gesture image based on edge pixels of a gesture edge in the binary image.

Optionally, the memory further stores computer-executable instructions for controlling the one or more processors to extract a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and one of the plurality of first rows of pixels that is immediately adjacent to the initial row of pixel; and fit the initial edge pixel and the plurality of first edge pixels to derive the central coordinate of the gesture in the first gesture image.

Optionally, the memory further stores computer-executable instructions for controlling the one or more processors to recognize a first connected domain in the binary image; and determine edge pixels of the first connected domain; wherein the edge pixels of the first connected domain are used as the edge pixels of the gesture edge for determining the central coordinate of the gesture in the first gesture image.

Optionally, the memory further stores computer-executable instructions for controlling the one or more processors to evaluate whether a present pixel is an edge pixel for pixels in the binary image one-by-one until all edge pixels in the binary image are identified; recognize one or more second connected domains based on a plurality of consecutively connected edge pixels from the edge pixels recognized in the binary image; and assign a connected domain having a largest area out of the one or more second connected domains as the first connected domain for determining the central coordinate of the gesture in the first gesture image.

Optionally, the memory further stores computer-executable instructions for controlling the one or more processors to acquire pixel values of a plurality of pixels adjacent to the present pixel; and determine whether the present pixel is the edge pixel based on the pixel values of the plurality of pixels adjacent to the present pixel; wherein the present pixel is determined not to be the edge pixel if each of the pixel values of the plurality of pixels adjacent to the present pixel is a first pixel value; and the present pixel is determined to be the edge pixel if at least one of the pixel values of the plurality of pixels adjacent to the present pixel is not the first pixel value.

Optionally, the apparatus further comprises a camera configured to capture the first gesture image.

In another aspect, the present invention provides a computer-program product comprising a non-transitory tangible computer-readable medium having computer-readable instructions thereon, the computer-readable instructions being executable by a processor to cause the processor to perform acquiring a first gesture image; determining a central coordinate of a gesture in the first gesture image; determining a controlling range in which the gesture has control over a terminal apparatus, based on the central coordinate of the gesture in the first gesture image; and controlling a control object in the controlling range to execute an operation based on a control instruction corresponding to the gesture.

BRIEF DESCRIPTION OF THE FIGURES

The following drawings are merely examples for illustrative purposes according to various disclosed embodiments and are not intended to limit the scope of the present invention.

FIG. 3 is a schematic diagram illustrating a method for evaluating whether a pixel is an edge pixel in some embodiments according to the present disclosure.

FIG. 4 is a schematic diagram of a plurality of first edge pixels in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a method for controlling a terminal apparatus, an apparatus for controlling a terminal apparatus, and a computer-program product that substantially obviate one or more of the problems due to limitations and disadvantages of the related art. In one aspect, the present disclosure provides a method for controlling a terminal apparatus. In some embodiments, the method includes acquiring a first gesture image; determining a central coordinate of a gesture in the first gesture image; determining a controlling range in which the gesture has control over the terminal apparatus, based on the central coordinate of the gesture in the first gesture image; and controlling a control object in the controlling range to execute an operation based on a control instruction corresponding to the gesture.

As used herein, the term gesture means a visual expression of a part of a human body (e.g., a hand of a user) or an inanimate object that is captured in an image of the form of motion or motionless digital images, wherein the gesture is both visually and digitally discernible from its surroundings and capable of being picked out by a pattern matching software. In the context of the present disclosure, the visual expression may include a shape of the part of the human body or the inanimate object, or a variation in the shape of the part, of the human body or the inanimate object, or a variation in the location of the part of the human body or the inanimate object, or an action of the human body or the inanimate object.

Figure 1:
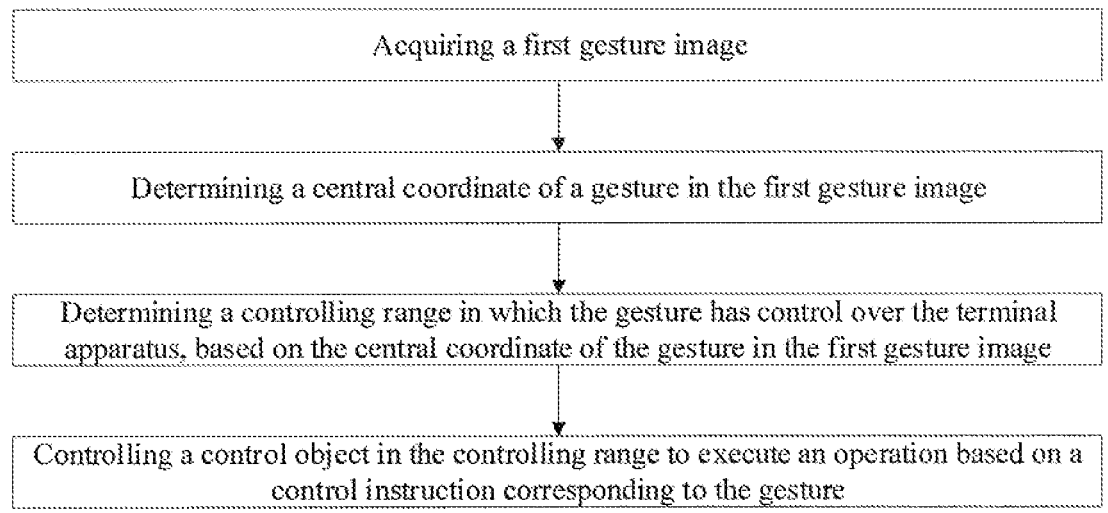
FIG. 1 is a schematic diagram illustrating a method for controlling a terminal apparatus in some embodiments according to the present disclosure.

FIG. 1 is a schematic diagram illustrating a method for controlling a terminal apparatus in some embodiments according to the present disclosure. Referring to FIG. 1, a method for controlling a terminal apparatus includes acquiring a first gesture image. Optionally, the terminal apparatus such as a mobile phone, a computer, a tablet personal computer is configured to have a camera, when a user controls the terminal apparatus with gesture, the camera can acquire the first gesture image. In some embodiments, the method for controlling the terminal apparatus further includes determining a central coordinate of a gesture in the first gesture image. Comparing to a method of calculating the spatial motion of gesture using the spatial algorithm, the method disclosed herein for determining the central coordinate of the gesture in the first gesture image by processing the first gesture image is simpler. The gesture made by a user's hand occupies certain space, when the gesture is presented in the first gesture image, the gesture is shown by a plurality of pixels which folios a domain (e.g., a finger domain, a palm domain, etc.) in the first gesture image. When the user uses the gesture to control the terminal apparatus, the gesture usually covers multiple objects of the terminal apparatus, in order to control a control object with accuracy, a central coordinate of the gesture can be extracted, and the terminal apparatus can be controlled based on the central coordinate of the gesture.

In one example, determining a central coordinate of a gesture in the first gesture image includes determining the central coordinate of the gesture based on a plurality of pixels of a domain (e.g., a finger domain) in the first gesture image, in another example, determining a central coordinate of a gesture in the first gesture image includes determining the central coordinate of the gesture based on edge pixels of a gesture edge in the domain, and fitting the edge pixels to derive the central coordinate of the gesture in the first gesture image.

In some embodiments, the method for controlling the terminal apparatus further includes determining a controlling range in which the gesture has control over the terminal apparatus, based on the central coordinate of the gesture in the first gesture image. In one example, the central coordinate of the gesture in the first gesture image is set as a center of a circle, the circle is drawn based on the central coordinate of the gesture in the first gesture image, and the circle is set as the controlling range to execute an operation.

In some embodiments, the method of controlling the terminal apparatus future includes controlling a control object in the controlling range to execute an operation based on a control instruction corresponding to the gesture. In one example, subsequent to determining the controlling range, the control object is determined when the control object falls in the controlling range. According to the relationship between controlling instructions and respective gestures, a controlling instruction is determined based on a respective gesture, and the terminal apparatus can execute a respective operation on the control object based on the controlling instruction corresponding to the respective gesture, thereby controlling the terminal apparatus via gestures.

In some embodiments, determining the central coordinate of the gesture in the first gesture image includes processing the first gesture image to obtain a binary image of the gesture, and determining the central coordinate of the gesture in the first gesture image based on the binary image. The pixel value of a binary image has only two possible values for each pixel, which can simplify the related calculations. Optionally, the central coordinate of the gesture in the first gesture image can be determined based on the edge pixels of a gesture edge in the binary image.

In some embodiment, prior to determining the central coordinate of the gesture in the first gesture image, all edge pixels are first identified. In one example, in a binary image, if the pixel values of a plurality of pixels adjacent to a target pixel are the same, it is assumed that the pixel value of the target pixel is the same as the pixel values of the plurality of pixels adjacent to the target pixel, according it can be determined that the target pixel is not an edge pixel. Otherwise, it can be determined that the target pixel is an edge pixel. Optionally, an edge pixel of a gesture edge according to the present disclosure refer to a pixel where not all pixel values of a plurality of pixels adjacent to that pixel are the same. In one example, evaluating whether a present pixel is an edge pixel in the binary image includes acquiring pixel values of a plurality of pixels adjacent to the present pixel; determining whether the present pixel is the edge pixel based on the pixel value of the plurality of pixels adjacent to the present pixel. Optionally, the present pixel is determined not to be the edge pixel if each of the pixel values of the plurality of pixels adjacent to the present pixel is a first pixel value. Optionally, the present pixel is determined to be the edge pixel if at least one of the pixel values of the plurality of pixels adjacent to the present pixel is not the first pixel value.

Figure 2:
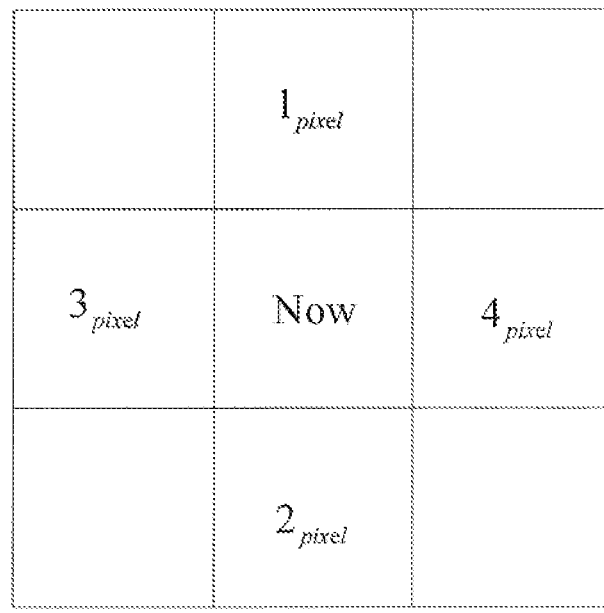
FIG. 2 is schematic diagram illustrating a method for evaluating whether a pixel is an edge pixel in some embodiments according to the present disclosure.

FIG. 2 is schematic diagram illustrating a method for evaluating whether a pixel is an edge pixel in some embodiments according to the present disclosure. A 4-neighor method is used to determine whether a present pixel is an edge pixel in the binary image. Referring to FIG. 2, the "Now" pixel is the present pixel. A pixel above the Now pixel is $1_{pixel}$, a pixel beneath the Now pixel is $2_{pixel}$, a pixel on the left of the Now pixel is $3_{pixel}$, and a pixel on the right of the Now pixel is $4_{pixel}$, and $1_{pixel}, 2_{pixel}, 3_{pixel}$, and $4_{pixel}$ are traversed. If all of the pixel values of $1_{pixel}, 2_{pixel}, 3_{pixel}$, and $4_{pixel}$ are 0, the Now pixel is not an edge pixel. If at least one of the pixel values of $1_{pixel}, 2_{pixel}, 3_{pixel}$, and $4_{pixel}$ is not 0 and is different from others, the Now pixel is an edge pixel.

FIG. 3 is a schematic diagram illustrating a method for evaluating whether a pixel is an edge pixel in some embodiments according to the present disclosure. An 8-neighor method is used to determine whether a present pixel is an edge pixel in the binary image. Referring to FIG. 3, Now pixel is the present pixel. A plurality of pixels adjacent to the present pixel are $1_{pixel}, 2_{pixel}, 3_{pixel}, 4_{pixel}, 5_{pixel}, 6_{pixel}, 7_{pixel}$, and $8_{pixel}$. If all of the pixel values of $1_{pixel}, 2_{pixel}, 3_{pixel}, 4_{pixel}, 5_{pixel}, 6_{pixel}, 7_{pixel}$ are 0, the Now pixel is not an edge pixel. If at least one of the pixel values of $2_{pixel}, 3_{pixel}, 4_{pixel}, 5_{pixel}, 6_{pixel}, 7_{pixel}$ is not 0 and is different from others, the Now pixel is an edge pixel.

In some embodiments, the method for evaluating whether a pixel is an edge pixel includes starting from an initial pixel using the above method to evaluate whether the pixel is an edge pixel. Subsequent to a determination that a present pixel is not an edge pixel, the process is reiterated for a next adjacent pixel. For example, the next adjacent pixel is assigned as a present pixel, and it is evaluated whether the next adjacent pixel (now assigned as the present pixel) is an edge pixel. The process is reiterated for all the pixels in the binary image one-by-one, until all edge pixels in the binary image are recognized.

In some embodiments, a position of each pixel can be represented by the row number and the column number where the pixel locates. In some embodiments, after recognizing all the edge pixels in the binary image, the method for determining the central coordinate of the gesture in the first gesture image includes extracting a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and the one of plurality of first rows of pixels that is immediately adjacent to the initial row of pixel. Optional, the distance between the initial row of pixel and the one of plurality of first rows of pixels is 2 rows of pixels, thus the plurality of first edge pixels are extracted from every other two rows of a plurality of first rows of pixels in the binary image. Coordinates of the plurality of first edge pixels from a plurality of first rows of pixels are described by the row number and the column number of the plurality of first edge pixels and stored in forms of arrays.

FIG. 4 is a schematic diagram of a plurality of first edge pixels in some embodiments according to the present disclosure. Referring to FIG. 4, each grid represents one of the pixels in the binary image. The pixel A is one of the plurality of first edge pixels. Optionally, the pixel A can be designated as the initial edge pixel from the initial row of pixels in the binary image. Starting from the initial row of pixels (i.e. the second row in FIG. 4), in every other row, two of first edge pixels from the row are extracted, e.g. pixel B and pixel C are extracted from the fourth row in FIG. 4 as two of the plurality of first edge pixels, and pixel D and pixel E are extracted from the sixth row in FIG. 4 as two of the plurality of first edge pixels. Optionally, the pixel A, pixel B, pixel C, pixel D, and pixel E are stored in forms of arrays.

In some embodiments, subsequent to traversing all the pixels of the plurality of first rows of pixels, the method for determining the central coordinate of the gesture in the first gesture image further includes fitting the initial edge pixel and the plurality of first edge pixels to derive the central coordinate of the gesture in the first gesture image. Coordinates of the plurality of first edge pixels and the initial edge pixel are coordinates in the binary image, i.e. row numbers and the column numbers of the plurality of first edge pixels and the initial edge pixel in the binary image. Optionally, the ellipse fining is used to obtain the central coordinate of the gesture in the first gesture image. The ellipse fitting means fitting the initial edge pixel and the plurality of first edge pixels to the following elliptic equation model: $ax^2+by^2+cxy+dx+ey+f=0$, to obtain an elliptic equation covering all of the initial edge pixel and the plurality of first edge pixels. For example, there must be an ellipse having all of the initial edge pixel and the plurality of first edge pixels as close as possible to the boundary of the ellipse, therefore, the parameters of a, b, c, d, e, f of the elliptic equation model can be calculated to obtain the elliptic equation of the ellipse. In one example, a process of ellipse fitting the initial edge pixel and the plurality of first edge pixels is performed based on a least square algorithm, the parameters of the elliptic equation model are calculated, and the elliptic equation of the ellipse is obtained. Subsequent to obtaining the elliptic equation of the ellipse, the coordinate of the center of the ellipse can be calculated, and the coordinate of the center of the ellipse can be designated as the central coordinate of the gesture in the first gesture image. Optionally, the circle fitting is used to obtain the central coordinate of the gesture in the first gesture image. In one example, the circle equation can be obtained by circle fitting the initial edge pixel and the plurality of first edge pixels. Subsequent to obtaining the circle equation, the coordinate of the center of the circle can be calculated, the coordinate of the center of the circle can be designated as the central coordinate of the gesture in the first gesture image. It is more efficient to obtain the central coordinate of the gesture in the first gesture image based on the edge pixels than based on all the pixels in a binary image.

In general, an object tends to form a connected domain in a binary image when the object is a continuous object. In some embodiments, prior to determining the central coordinate of the gesture in the first gesture image, the method for controlling a terminal apparatus further includes recognizing a first connected domain in the binary image; determining edge pixels of the first connected domain. Optionally, the edge pixels of the first connected domain are used as the edge pixels of the gesture edge in the first gesture image for determining the central coordinate of the gesture in the first gesture image. By using the first connected domain for the purpose of determining the central coordinate of the gesture, the scope for searching the central coordinate of the gesture can be further narrowed, thereby enhancing the accuracy in determining the central coordinate of the gesture.

Figure 5:
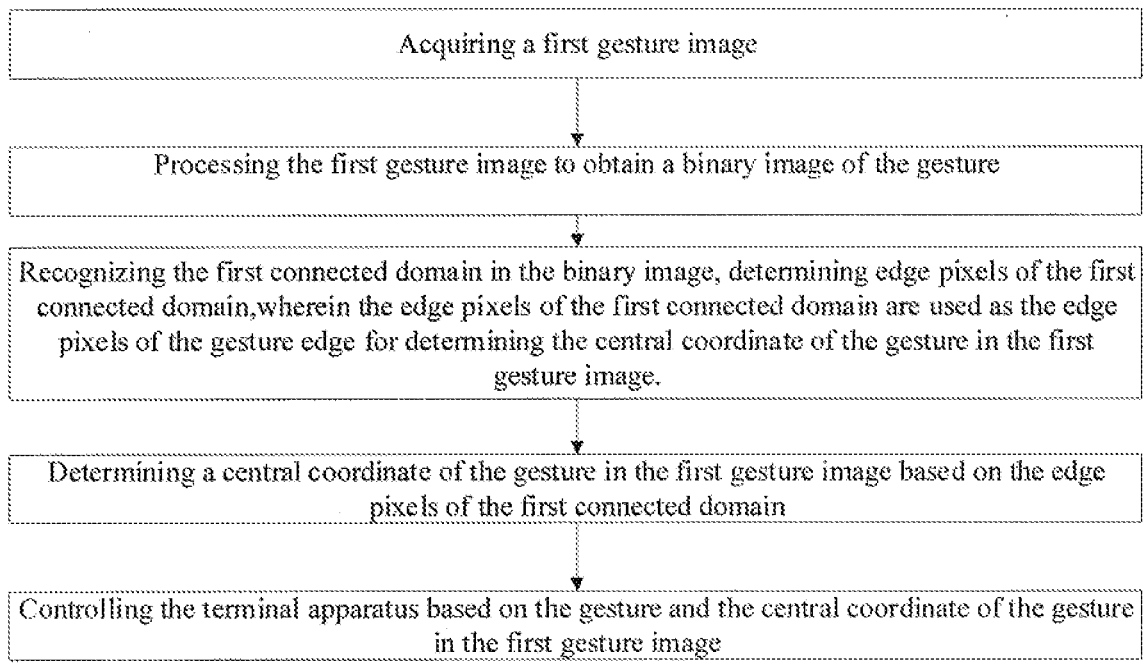
FIG. 5 is a schematic diagram illustrating a method for controlling a terminal apparatus in some embodiments according to the present disclosure.

FIG. 5 is a schematic diagram illustrating a method for controlling a terminal apparatus in some embodiments according to the present disclosure. Referring to FIG. 5, a method for controlling a terminal apparatus includes acquiring a first gesture image; processing the first gesture image to obtain a binary image of the gesture; recognizing a first connected domain in the binary image, and determining edge pixels of the first connected domain. Optionally, the edge pixels of the first connected domain are used as the edge pixels of the gesture edge for determining the central coordinate of the gesture in the first gesture image; and the method further includes determining a central coordinate of the gesture in the first gesture image based on the edge pixels of the first connected domain; and controlling the terminal apparatus based on the gesture and the central coordinate of the gesture in the first gesture image.

Optionally, the terminal apparatus such as a mobile phone, a computer, a tablet personal computer is configured to have a camera, when a user controls the terminal apparatus with gesture, the camera can acquire the first gesture image. Optionally, the first gesture image is an RGB image.

Figure 6:
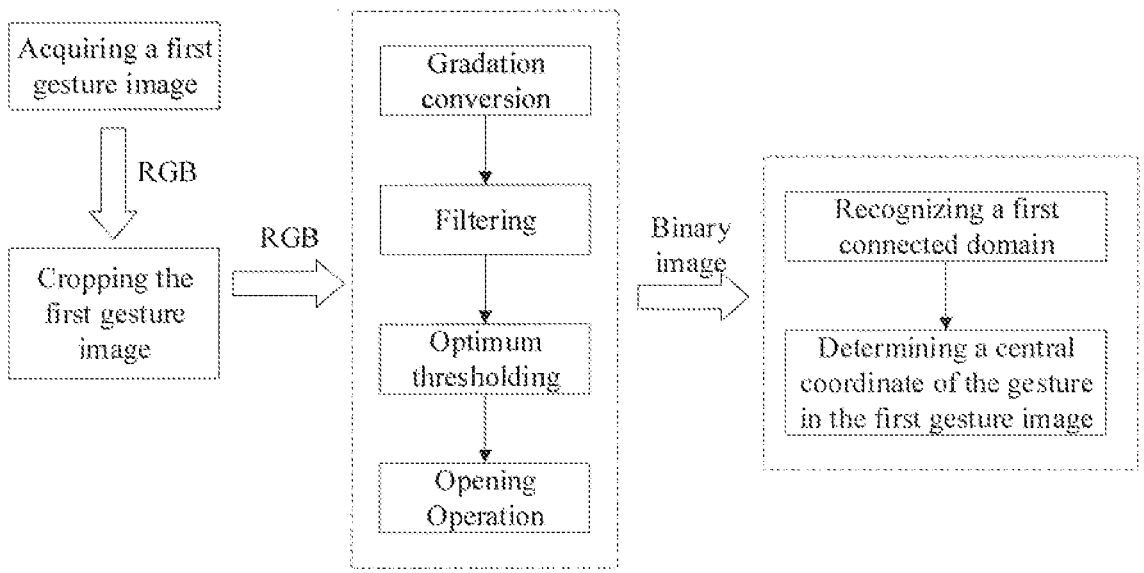
FIG. 6 is a schematic diagram illustrating a method for controlling a terminal apparatus in some embodiments according to the present disclosure.

FIG. 5 is a schematic diagram illustrating a method for controlling a terminal apparatus in some embodiments according to the present disclosure. Referring to both FIG. 5 and FIG. 6, in the step of processing the first gesture image to obtain the binary image of the gesture, subsequent to obtaining the first gesture image, the first gesture image is cropped to a first size to obtain a second gesture image. Optionally, portions of the first gesture image without any information of the gesture are cropped off, so that the second gesture image contains only information of the gesture, reducing the work load of data processing. Optionally, subsequent to obtaining the second gesture image, a gradation conversion is performed on the second gesture image to obtain a first grayscale gesture image. Subsequent to obtaining the first grayscale gesture image, the first grayscale gesture image is filtered to obtain a second grayscale gesture image to reduce the noise of the first grayscale image and to enhance the accuracy of recognition. Optionally, Gaussian filtering is applied to filter the first grayscale gesture image.

Figure 7:
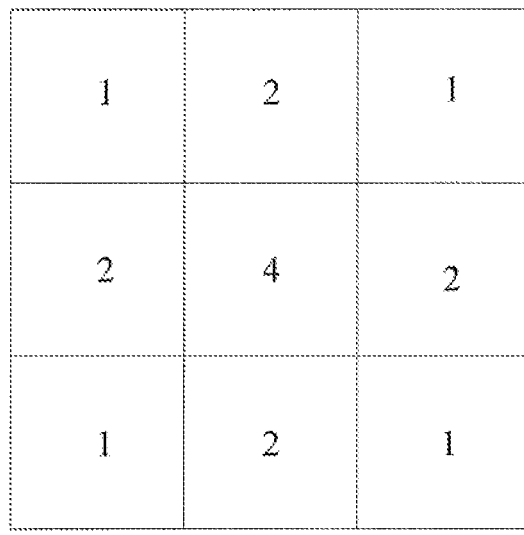
FIG. 7 is a schematic diagram of a second grayscale gesture image after applying Gaussian filtering to a first grayscale gesture image in some embodiments according to the present disclosure.

In one example, during Gaussian filtering, the entire first grayscale gesture image is traversed by a 3*3 grid template, in another example, referring to FIG. 7 which is a schematic diagram of a second grayscale gesture image after applying Gaussian filtering to a first grayscale gesture image in some embodiments according to the present disclosure, pixel values of the nine pixels are the pixel values of pixels in the second grayscale gesture image after the Gaussian filtering is applied. After applying the Gaussian filter, only image data of 3 rows of grids are cached, which reduces the storage footprint.

In some embodiments, subsequent to obtaining the second grayscale gesture image, an optimum thresholding is applied by comparing a pixel value of each pixel in the second grayscale gesture image with a threshold pixel value, and thereby classifying the pixels into two groups based on the comparison results between each pixel value of pixels in the second grayscale gesture image and the threshold pixel value. In one example, subsequent to comparing a pixel value of each pixel in the second grayscale gesture image with a threshold pixel value, pixels having pixel values greater than or equal to the threshold pixel value are assigned as a plurality of first pixels. Optionally, a first pixel value is assigned to each of the plurality of first pixels. Optionally, the first pixel value is 0. Pixels having pixel values less than the threshold pixel value are assigned as a plurality of second pixels. Optionally, a second pixel value is assigned to each of the plurality of second pixels. Optionally, the second pixel value is 1. In some embodiments, subsequent to replacing the pixels value pixels in the second grayscale gesture image with the first pixel value or the second pixel value, an intermediate binary image is obtained, pixels of the intermediate binary image are only assigned with the first pixel value or the second pixel value.

In some embodiments, subsequent to obtaining the intermediate binary image, a boundary erosion and expansion operation is performed on the intermediate binary image to obtain the binary image of the gesture.

In some embodiments, the first connected domain is recognized in the binary image, edge pixels of the first connected domain are determined, and the edge pixels of the first connected domain are used as the edge pixels of the gesture edge for determining the central coordinate of the gesture in the first gesture image. Subsequent to obtaining the first connected domain, a present pixel is evaluated whether it is an edge pixel for pixels in the first connected domain one-by-one until all edge pixels in the first connected domain are identified. In one example, in the first connected domain, if the pixel values of a plurality of pixels adjacent to a target pixel are the same, it is assumed that the pixel value of the target pixel is the same as the pixel values of the plurality of pixels adjacent to the pixel, according it can be determined that the target pixel is not an edge pixel. Otherwise, it can be determined that the target pixel is an edge pixel. Optionally, an edge pixel of a gesture edge according to the present disclosure refer to a pixel where not all pixel values of a plurality of pixels adjacent to that pixel are the same. In one example, evaluating whether a present pixel is an edge pixel in the binary image includes acquiring pixel values of a plurality of pixels adjacent to the present pixel; determining whether the present pixel is the edge pixel based on the pixel value of the plurality of pixels adjacent to the present pixel. Optionally, the present pixel is determined not to be the edge pixel if each of the pixel values of the plurality of pixels adjacent to the present pixel is a first pixel value. Optionally, the present pixel is determined to be the edge pixel if at least one of the pixel values of the plurality of pixels adjacent to the present pixel is not the first pixel value.

In some embodiments, subsequent to identifying all edge pixels in the binary image, one or more second connected domains can be recognized based on a plurality of consecutively connected edge pixels from the edge pixel in the binary image. Optionally, a connected domain having a largest area out of the one or more second connected domains is assigned as the first connected domain for the purpose of determining the central coordinate of the gesture in the first gesture image. Subsequent to obtaining the first connected domain, edge pixels of the first connected domain can also be determined.

In some embodiments, subsequent to obtaining the edge, pixels of the first connected domain, the central coordinate of the gesture in the first gesture image can be obtained based on the edge pixels of the first connected domain. Optionally, the edge pixels of the first connected domain are used as the edge pixels of the gesture edge, for determining the central coordinate of the gesture in the first gesture image.

Optionally, the ellipse fitting is used to obtain the central coordinate of the gesture in the first gesture image. Optionally, a plurality of first edge pixels from a plurality of first rows of pixels in the first connected domain are extracted based on an initial row of pixel in the first connected domain, any two directly adjacent rows of the plurality of first rows of pixels are spaced apart by a same distance as a distance between the initial row of pixel and one of the plurality of first rows of pixels that is immediately adjacent to the initial row of pixel, and the initial edge pixel and the plurality of first edge pixels is fitted to derive the central coordinate of the gesture in the first connected domain. By obtaining the first connected domain and fitting the first edge pixels of the first connected domain, the fitting process can be made easier and the computation more efficient. Also, the central coordinate of the gesture can be obtained within the first connected domain, increasing the accuracy of recognition.

In some embodiments, subsequent to determining the central coordinate of the gesture, the terminal apparatus is controlled based on the gesture and the central coordinate of the gesture in the first gesture image. Optionally, the central coordinate of the gesture in the first gesture image is set as a center of a circle, the circle is drawn based on the central coordinate of the gesture in the first gesture image. Optionally, the circle is set as the controlling range for executing an operation. Subsequent to determining the range for executing an operation, the control object is determined when the control object falls within the controlling range. According to the relationship between controlling instructions and respective gestures, a controlling instruction is determined based on a respective gesture, and the terminal apparatus can execute a respective operation on the control object based on the controlling instruction corresponding to the gesture. The gesture recognition method in the present disclosure can accurately and rapidly calculate the central coordinate of a gesture, hardware implementation of which can be easily achieved without requiring excessive resources and costs.

In some embodiments, to enhance the accuracy of recognition, prior to determining the central coordinate of the gesture in the first gesture image, the binary image is scanned to identify one or more noise rows from a plurality of rows of pixel, and the one or more noise rows are deleted from the binary image. Optionally, a plurality of first pixels in the binary image are extracted by scanning the binary image, and each of the plurality of first pixels has a first pixel value. In other words, a plurality of pixels with a first pixel value, are extracted. Subsequent to extracting all first pixels of plurality of first pixels in the binary image, a total number of first pixels of the plurality of first pixels in a present row of the plurality of rows of pixels are polled based on the position of the plurality of first pixels in the binary image, e.g. based on the rows and the columns where the plurality of first pixels locate. Subsequently, the total number of first pixels of the plurality of first pixels in the present row of the plurality of rows of pixels is compared with a threshold value. Optionally, if the total number of first pixels of the plurality of first pixels in the present row of the plurality of rows of pixels is less than the threshold value, the present row of the plurality of rows of pixels is assigned as a noise row of the one or more noise rows. Optionally, the total numbers of first pixels of the plurality of first pixels in each row of the plurality of rows of pixels is obtained one-by-one for all rows of the plurality of rows of pixels, and the total numbers of first pixels of the plurality of first pixels in all rows of the plurality of rows of pixels are respectively compared with the threshold value, thereby identifying all noise rows in the binary image. The comparison can be performed each time the total numbers of first pixels of the plurality of first pixels in one row is polled. Optionally, the comparison can be performed after the total numbers a f first pixels of the plurality of first pixels for all rows are polled.

In one example, the first pixel value is 0, a total number of pixels of the plurality of pixels with pixel value 0 in a present row of the plurality of rows of pixels is polled. If the total number of pixels of the plurality of pixels with pixel value 0 in a present row of the plurality of rows of pixels is less than the threshold value, the present row of the plurality of rows of pixels is assigned as a noise row of one or more noise rows. Subsequent to identifying one or more noise rows from a plurality of rows of pixels, the one or more noise rows are deleted from the binary image. By doing this, the quality of the binary image and the accuracy of the gesture recognition can be significantly improved.

In some embodiments, the step of determining the central coordinate of the gesture in the first gesture image includes processing the first gesture image to obtain a binary image of the gesture; recognizing one or more finger domains in the binary image, and caching data of the one or more finger domains in a memory; and determining the central coordinate of the gesture in the first gesture image based on the one or more finger domains. Optionally, to reduce storage footprint, caching the data of the one or more finger domains in the memory includes caching the data of selected rows of the one or more finger domains. For example, every other row of the one or more finger domains can be selected, and the data of the one or more finger domains from every other row is cached in the memory.

In some embodiments, the step of determining the central coordinate of the gesture in the first gesture image based on the one or more finger domains includes accumulating pixel values of each row of pixels in each of the one or more finger domains to obtain multiple accumulated row pixel values for each of the one or more finger domains, and accumulating pixel values of each column of pixels in each of the one or more finger domains to obtain multiple accumulated column pixel values for each of the one or more finger domains; determining a first maximum accumulated pixel value from a plurality of first accumulated pixel values including the multiple accumulated row pixel values for each of the one or more finger domains, determining a second maximum accumulated pixel value from a plurality of second accumulated pixel values including the multiple accumulated column pixel values for each of the one or more finger domains; and determining the central coordinate of the gesture in the first gesture image based on a row corresponding to the first maximum accumulated pixel value and a column corresponding to the second maximum accumulated pixel value.

Figure 8:
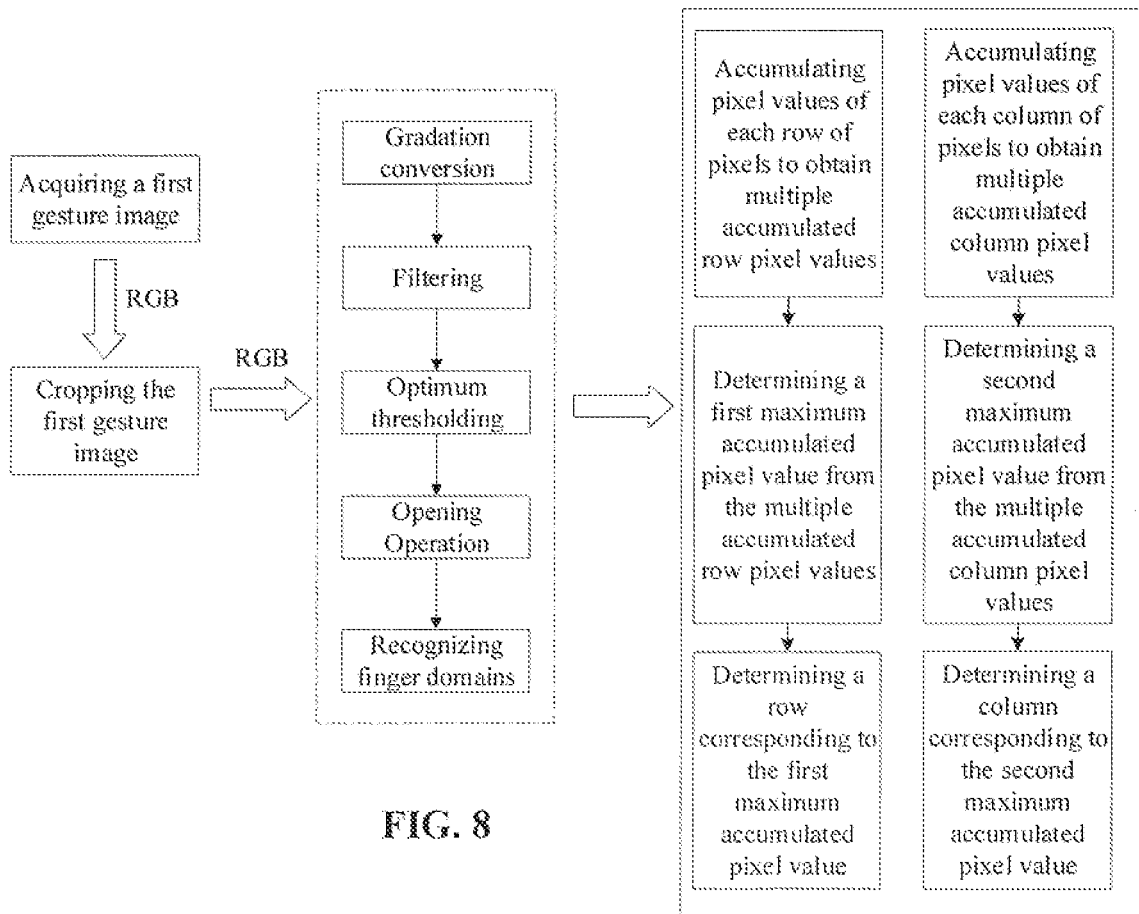
FIG. 8 is a schematic diagram illustrating a method for controlling a terminal apparatus in some embodiments according to the present disclosure.

FIG. 8 is a schematic diagram illustrating a method for controlling a terminal apparatus in some embodiments according to the present disclosure. Referring to FIG. 8, a first guest image is acquired by a camera. The first gesture image is an RGB image. Subsequent to obtaining the first gesture image, the first gesture image is cropped to a first size to obtain a second gesture image. Subsequent to obtaining the second gesture image, a gradation conversion is performed on the second gesture image to obtain a first grayscale gesture image. Subsequent to obtain the first grayscale gesture image, the first grayscale gesture image is filtered to obtain a second grayscale gesture. Optionally, Gaussian filtering is applied to filter the first grayscale gesture image. Subsequent to obtaining the second grayscale gesture image, an optimum thresholding is applied by comparing a pixel value of each pixel in the second grayscale gesture image with a threshold pixel value and classifying the pixels into two groups based on the comparison results between each pixel value of pixels in the second grayscale gesture image and the threshold pixel value. In one example, subsequent to comparing a pixel value of each pixel in the second grayscale gesture image with a threshold pixel value, pixels having pixel values greater than or equal to the threshold pixel value are assigned as a plurality of first pixels, and optionally a first pixel value is assigned to each of the plurality of first pixels. Optionally, the first pixel value is 0. Pixels having pixel values less than the threshold pixel value are assigned as a plurality of second pixels, and optionally a second pixel value is assigned to each of the plurality of second pixels. Optionally, the second pixel value is 1. Subsequent to replacing the pixels value pixels in the second grayscale gesture image with the first pixel value or the second pixel value, an intermediate binary image is obtained including the first pixel value and the second pixel value. Subsequent to obtaining the intermediate binary image, an opening operation (i.e. a boundary erosion followed by a dilation) is applied on the intermediate binary image thereby obtaining a binary image of the gesture. Subsequent to obtaining the binary image of the gesture, one or more finger domains are recognized in the binary image, and data of the one or more finger domains is cached in the memory. Subsequent to recognizing one or more finger domains in the binary image, the pixel values of each row of pixels in each of the one or more finger domains are accumulated thereby obtaining multiple accumulated row pixel values for each of the one or more finger domains, and the pixel values of each column of pixels in each of the one or more finger domains are accumulated thereby obtaining multiple accumulated column pixel values for each of the one or more finger domains. A first maximum accumulated pixel value from a plurality of first accumulated pixel values including the multiple accumulated row pixel values for each of the one or more finger domains is determined, and a second maximum accumulated pixel value from a plurality of second accumulated pixel values including the multiple accumulated column pixel values for each of the one or more figure domains is determined, therefore, a row corresponding to the first maximum accumulated pixel value can be obtained (e.g. Row x), and a column corresponding to the first maximum accumulated pixel value can be obtained (e.g. Column y), therefore, the coordinate of (x, y) is assigned as the central coordinate of the gesture in the first gesture image. Subsequent to obtaining the central coordinate of the gesture in the first gesture image, a control range in which the gesture has control over the terminal apparatus is determined based on the central coordinate of the gesture in the first gesture image; and a control object in the controlling range is controlled to execute an operation based on a control instruction corresponding to the gesture.

As compared to a method of calculating the spatial motion of gesture using the spatial algorithm, the present method for determining the central coordinate of the gesture is simpler. The gesture recognition method in the present disclosure can accurately and rapidly calculate the central coordinate of a gesture, hardware implementation of which can be easily achieved without requiring excessive resources and costs. A highly accurate control of the terminal apparatus can be achieved, obviating complicated calculation processes in gesture recognition and terminal apparatus control.

Figure 9:
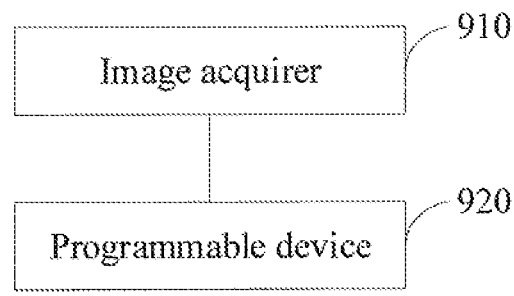
FIG. 9 is a schematic diagram illustrating the structure of a gesture recognition apparatus in some embodiments according to the present disclosure.

FIG. 9 is a schematic diagram illustrating the structure of a gesture recognition apparatus in some embodiments according to the present disclosure. Referring to FIG. 9, the gesture recognition apparatus in some embodiments includes an image acquirer 910, and a programmable device 920. In some embodiments, the image acquirer 910 (e.g., a camera, a video camera, etc) is configured to acquire a first gesture image, and to, send the first gesture image to the programmable device 920. In some embodiments, the programmable device 920 is configured to determine a central coordinate of a gesture in the first gesture image; to determine a controlling range in which the gesture has control over the terminal apparatus, based on the central coordinate of the gesture in the first gesture image; and to control a control object in the controlling range to execute an operation based on a control instructions corresponding to the gesture. Optionally, the programmable device 920 adopts Field Programmable Gate Array (FPGA). Optionally, the programmable device 920 adopts Complex Programmable Logic Device (CPLD).

In some embodiments, the gesture recognition apparatus is configured to determine the central coordinate of the gesture in the first gesture image, which includes processing the first gesture image to obtain a binary image of the gesture; and determining the central coordinate of the gesture in the first gesture image based on edge pixels of a gesture edge in the binary image. In some embodiments, the gesture recognition apparatus is configured to determine the central coordinate of the gesture in the first gesture image based on edge pixels of the gesture edge in the binary image, which includes extracting a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and one of the plurality of first rows of pixels that is immediately adjacent to the initial row of pixel; and fitting the initial edge pixel and the plurality of first edge pixels to derive the central coordinate of the gesture in the first gesture image. In some embodiments, prior to determining the central coordinate of the gesture in the first gesture image based on edge pixels of the gesture edge in the binary image, the gesture recognition apparatus is configured to recognize a first connected domain in the binary image; and to determine edge pixels of the first connected domain; wherein the edge pixels of the first connected domain are used as the edge pixels of the gesture edge for determining the central coordinate of the gesture in the first gesture image.

In some embodiments, the gesture recognition apparatus is configured to recognize the first connected domain in the binary image including evaluating whether a present pixel is an edge pixel for pixels in the binary image one-by-one until all edge pixels in the binary image are identified; recognizing one or more second connected domains based on a plurality of consecutively connected edge pixels from the edge pixels recognized in the binary image; and assigning a connected domain having a largest area out of the one or more second, connected domains as the first connected domain for determining the central coordinate of the gesture in the first gesture image.

In some embodiments, the gesture recognition apparatus is configured to evaluate whether the present pixel is the edge pixel including acquiring pixel values of a plurality of pixels adjacent to the present pixel; and determining whether the present pixel is the edge pixel based on the pixel values of the plurality of pixels adjacent to the present pixel; wherein the present pixel is determined not to be the edge pixel if each of the pixel values of the plurality of pixels adjacent to the present pixel is a first pixel value; and the present pixel is determined to be the edge pixel if at least one of the pixel values of the plurality of pixels adjacent to the present pixel is not the first pixel value.

In some embodiments, prior to determining the central coordinate of the gesture in the first gesture image, the gesture recognition apparatus is configured to scan the binary image to identify one or more noise rows from a plurality of rows of pixels; and delete the one or more noise rows from the binary image.

In some embodiments, the gesture recognition apparatus is configured to scan the binary image to identify the one or more noise rows from the plurality of rows of pixels including scanning the binary image extract a plurality of first pixels in the binary image, each of which has a first pixel value; polling a total number of first pixels of the plurality of first pixels in a present row of the plurality of rows of pixels, based on positions of the plurality of first pixels in the binary image; and assigning the present row of the plurality of rows of pixels as a noise row of the one or more noise rows based on a determination that the total number of first pixels of the plurality of first pixels in the present row of the plurality of rows of pixels is less than a threshold value.

In some embodiments, the gesture recognition apparatus is configured to determine the central coordinate of the gesture in the first gesture image including processing the first gesture image to obtain a binary image of the gesture; recognizing one or more finger domains in the binary image, and caching data of the one or more finger domains in a memory; and determining the central coordinate of the gesture in the first gesture image based on the one or more finger domains.

In some embodiments, the gesture recognition apparatus is configured to determine the central coordinate of the gesture in the first gesture image based on the one or more finger domains including accumulating pixel values of each row of pixels in each of the one or more finger domains to obtain multiple accumulated row pixel values for each of the one or more finger domains; accumulating pixel values of each column of pixels in each of the one, or more finger domains to obtain multiple accumulated column pixel values for each of the one or more finger domains; determining a first maximum accumulated pixel value from a plurality of first accumulated pixel values including the multiple accumulated row pixel values for each of the one or more finger domains; determining a second maximum accumulated pixel value from a plurality of second accumulated pixel values including the multiple accumulated column pixel values for each of the one or more finger domains; and determining the central coordinate of the gesture in the first gesture image based on a row corresponding to the first maximum accumulated pixel value and a column corresponding to the second maximum accumulated pixel value.

In some embodiments, the gesture recognition apparatus is configured to cache the data of the one or more finger domains in the memory includes caching the data of selected rows of the one or more finger domains.

Since only some simple operations such as "multiplication", "addition", "and", "or" are adopted by the gesture recognition apparatus, and data of up to three rows of the gesture image are cached, less hardware resources are occupied.

In some embodiments, the gesture recognition apparatus is configured to process the first gesture image to obtain the binary image of the gesture including cropping the first gesture image to a first size to obtain a second gesture image, the first gesture image and the second gesture image being color images; performing gradation conversion on the second gesture image to obtain a first grayscale gesture image; filtering the first grayscale gesture image to obtain a second grayscale gesture image; determining pixel values of pixels in the second grayscale gesture image; comparing a pixel value of each pixel in the second grayscale gesture image with a threshold pixel value; assigning pixels having pixel values greater than or equal to the threshold pixel value as a plurality of first pixels, each of which assigned a first pixel value, and pixels having pixel values less than the threshold pixel value as a plurality of second pixels, each of which assigned a second pixel value, thereby obtaining an intermediate binary image; and performing a boundary erosion and expansion operation on the intermediate binary image thereby obtaining the binary image of the gesture.

In some embodiments, the gesture recognition apparatus is configured to acquire the first gesture image and to send the acquired first gesture image to the programmable device 920 using the image acquirer 910, the programmable device 920 determines the central coordinate of a gesture in the first gesture image, thereby determines a controlling range in which the gesture has control over the terminal apparatus based on the central coordinate of the gesture in the first gesture image, thereby controls a control object in the controlling range to execute an operation based on a control instruction corresponding to the gesture.

Figure 10:
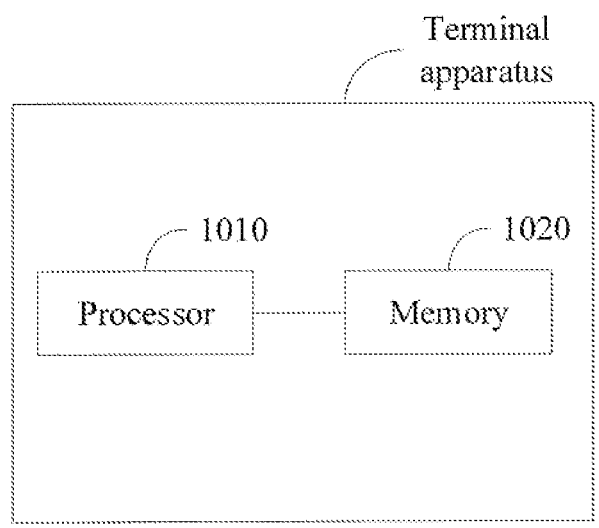
FIG. 10 is a schematic diagram illustrating the structure of a terminal apparatus in some embodiments according to the present disclosure.

FIG. 10 is a schematic diagram illustrating the structure of an electronic apparatus in some embodiments according to the present disclosure. Referring to FIG. 10, the electronic apparatus in some embodiments includes a processor 1010 and a memory 1020. In some embodiment, the processor 1010 is configured to read an executable program code stored in the memory 1020 and to run a program corresponding to the executable program code in the memory 1020, thereby to perform the method for controlling a terminal apparatus.

In some embodiments, the memory 1020 is a non-transitory computer readable storage medium. There are computer programs stored in the non-transitory computer readable storage medium, when the computer programs are executed by the processor 1010, the method for controlling a terminal apparatus can be performed.

Various appropriate memory may be used in the present virtual image display apparatus. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory. Various appropriate processors may be used in the present virtual image display apparatus. Examples of appropriate processors include, but are not limited to, a general-purpose processor, a central processing unit (CPU), a microprocessor, a digital signal processor (DSP), a controller, a microcontroller, a state machine, etc.

In some embodiments, the processor 1010 is a logical operation apparatus having data processing capabilities and/or program execution capabilities, such as Central Processing Unit (CPU), Field-Programmable Gate Array (FPGA), Microcontroller Unit (MCU), Digital Signal Processor (DSP), Application-Specific Integrated Circuit (ASIC), graphics processing unit (GPU).

In another aspect, the present disclosure provides an apparatus for controlling a terminal apparatus. In some embodiments, the apparatus for controlling a terminal apparatus includes a memory; and one or more processors. The memory and the one or more processors are connected with each other. The memory stores computer-executable instructions for controlling the one or more processors to acquire a first gesture image; determine a central coordinate of a gesture in the first gesture image; determine a controlling range in which the gesture has control over the terminal apparatus, based on the central coordinate of the gesture in the first gesture image; and control a control object in the controlling range to execute an operation based on a control instruction corresponding to the gesture.

In some embodiments, the memory further stores computer-executable instructions for controlling the one or more processors to process the first gesture image to obtain a binary image of the gesture; and determine the central coordinate of the gesture in the first gesture image based on edge pixels of a gesture edge in the binary image.

In some embodiments, the memory further stores computer-executable instructions for controlling the one or more processors to extract a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and one of the plurality of first rows of pixels that is immediately adjacent to the initial row of pixel; and lit the initial edge pixel and the plurality of first edge pixels to derive the central coordinate of the gesture in the first gesture image.

In some embodiments, the memory further stores computer-executable instructions for controlling the one or more processors to, prior to determining the central coordinate of the gesture in the first gesture image based on edge pixels of the gesture edge in the binary image, recognize a first connected domain in the binary image; and determine edge pixels of the first connected domain. Optionally, the edge pixels of the first connected domain are used as the edge pixels of the gesture edge for determining the central coordinate of the gesture in the first gesture image.

In some embodiments, the memory further stores computer-executable instructions for controlling the one or more processors to evaluate whether a present pixel is an edge pixel for pixels in the binary image one-by-one until all edge pixels in the binary image are identified; recognize one or more second connected domains based on a plurality of consecutively connected edge pixels from the edge pixels recognized in the binary image; and assign a connected domain having a largest area out of the one or more second connected domains as the first connected domain for determining the central coordinate of the gesture in the first gesture image. Optionally, the memory further stores computer-executable instructions for controlling the one or more processors to acquire pixel values of a plurality of pixels adjacent to the present pixel; and determine whether the present pixel is the edge pixel based on the pixel values of the plurality of pixels adjacent to the present pixel. Optionally, the present pixel is determined not to be the edge pixel if each of the pixel values of the plurality of pixels adjacent to the present pixel is a first pixel value. Optionally, the present pixel is determined to be the edge pixel if at least one of the pixel values of the plurality of pixels adjacent to the present pixel is not the first pixel value.

In some embodiments, the apparatus for controlling a terminal apparatus further includes a camera configured to capture the first gesture image.

In some embodiments, the memory further stores computer-executable instructions for controlling the one or more processors to, prior to determining the central coordinate of the gesture in the first gesture image, scan the binary image to identify one or more noise rows from a plurality of rows of pixels; and delete the one or more noise rows from the binary image. Optionally, the memory further stores computer-executable instructions for controlling the one or more processors to scan the binary image extract a plurality of first pixels in the binary image, each of which has a first pixel value; poll a total number of first pixels of the plurality of first pixels in a present row of the plurality of rows of pixels, based on positions of the plurality of first pixels in the binary image; and assign the present row of the plurality of rows of pixels as a noise row of the one or more noise rows based on a determination that the total number of first pixels of the plurality of first pixels in the present row of the plurality of rows of pixels is less than a threshold value.

In some embodiments, the memory further stores computer-executable instructions for controlling the one or more processors to process the first gesture image to obtain a binary image of the gesture; recognize one or more finger domains in the binary image, and cache data of the one or more finger domains in a memory; and determining the central coordinate of the gesture in the first gesture image based on the one or more finger domains. Optionally, the memory further stores computer-executable instructions for controlling the one or more processors to accumulate pixel values of each row of pixels in each of the one or more finger domains to obtain multiple accumulated row pixel values for each of the one or more finger domains; accumulate pixel values of each column of pixels in each of the one or more finger domains to obtain multiple accumulated column pixel values for each of the one or more finger domains; determine a first maximum accumulated pixel value from a plurality of first accumulated pixel values comprising the multiple accumulated row pixel values for each of the one or more finger domains; determine a second maximum accumulated pixel value from a plurality of second accumulated pixel values comprising the multiple accumulated column pixel values for each of the one or more finger domains; and determine the central coordinate of the gesture in the first gesture image based on a row corresponding to the first maximum accumulated pixel value and a column corresponding to the second maximum accumulated pixel value. Optionally, the memory further stores computer-executable instructions for controlling the one or more processors to process the first gesture image to cache the data of selected rows of the one or more finger domains.

In some embodiments, the memory further stores computer-executable instructions for controlling the one or more processors to crop the first gesture image to a first size to obtain a second gesture image, the first gesture image and the second gesture image being color images; perform gradation conversion on the second gesture image to obtain a first grayscale gesture image; filter the first grayscale gesture image to obtain a second grayscale gesture image; determine pixel values of pixels in the second grayscale gesture image; compare a pixel value of each pixel in the second grayscale gesture image with a threshold pixel value; assign pixels having pixel values greater than or equal to the threshold pixel value as a plurality of first pixels, each of which assigned a first pixel value, and pixels having pixel values less than the threshold pixel value as a plurality of second pixels, each of which assigned a second pixel value, to obtain an intermediate binary image; and perform a boundary erosion and expansion operation on the intermediate binary image thereby obtaining the binary image of the gesture.

In another aspect, the present disclosure further provides a computer-program product including a non-transitory tangible computer-readable medium having computer-readable instructions thereon. The computer-readable instructions are executable by a processor to cause the processor to perform acquiring a first gesture image; determining a central coordinate of a gesture in the first gesture image; determining a controlling range in which the gesture has control over the terminal apparatus, based on the central coordinate of the gesture in the first gesture image; and controlling a control object in the controlling range to execute an operation based on a control instruction corresponding to the gesture.

In some embodiments, the computer-readable instructions are executable by a processor to further cause the processor to perform processing the first gesture image to obtain a binary image of the gesture; and determining the central coordinate of the gesture in the first gesture image based on edge pixels of a gesture edge in the binary image. Optionally, the computer-readable instructions are executable by a processor to further cause the processor to perform extracting a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and one of the plurality of first rows of pixels that is immediately adjacent to the initial row of pixel; and fitting the initial edge pixel and the plurality of first edge pixels to derive the central coordinate of the gesture in the first gesture image.

In some embodiments, the computer-readable instructions are executable by a processor to further cause the processor to perform, prior to determining the central coordinate of the gesture in the first gesture image based on edge pixels of the gesture edge in the binary image, recognizing a first connected domain in the binary image; and determining edge pixels of the first connected domain. Optionally, the edge pixels of the first connected domain are used as the edge pixels of the gesture edge for determining the central coordinate of the gesture in the first gesture image.

Optionally, the computer-readable instructions are executable by a processor to further cause the processor to perform evaluating whether a present pixel is an edge pixel for pixels in the binary image one-by-one until all edge pixels in the binary image are identified; recognizing one or more second connected domains based on a plurality of consecutively connected edge pixels from the edge pixels recognized in the binary image; and assigning a connected domain having a largest area out of the one or more second connected domains as the first connected domain for determining the central coordinate of the gesture in the first gesture image.

Optionally, the computer-readable instructions are executable by a processor to further cause the processor to perform acquiring pixel values of a plurality of pixels adjacent to the present pixel; and determining whether the present pixel is the edge pixel based on the pixel values of the plurality of pixels adjacent to the present pixel. Optionally, the present pixel is determined not to be the edge pixel if each of the pixel values of the plurality of pixels adjacent to the present pixel is a first pixel value. Optionally, the present pixel is determined to be the edge pixel if at least one of the pixel values of the plurality of pixels adjacent to the present pixel is not the first pixel value.

In some embodiments, the computer-readable instructions are executable by a processor to further cause the processor to perform, prior to determining the central coordinate of the gesture in the first gesture image, scanning the binary image to identify one or more noise rows from a plurality of rows of pixels; and deleting the one or more noise rows from the binary image. Optionally, the computer-readable instructions are executable by a processor to further cause the processor to perform scanning the binary image extract a plurality of first pixels in the binary image, each of which has a first pixel value; polling a total number of first pixels of the plurality of first pixels in a present row of the plurality of rows of pixels, based on positions of the plurality of first pixels in the binary image; and assigning the present row of the plurality of rows of pixels as a noise row of the one or more noise rows based on a determination that the total number of first pixels of the plurality of first pixels in the present row of the plurality of rows of pixels is less than a threshold value.

In some embodiments, the computer-readable instructions are executable by a processor to further cause the processor to perform processing the first gesture image to obtain a binary image of the gesture; recognizing one or more finger domains in the binary image, and caching data of the one or more finger domains in a memory; and determining the central coordinate of the gesture in the first gesture image based on the one or more finger domains. Optionally, the computer-readable instructions are executable by a processor to further cause the processor to perform accumulating pixel values of each row of pixels in each of the one or more finger domains to obtain multiple accumulated row pixel values for each of the one or more finger domains; accumulating pixel values of each column of pixels in each of the one or more finger domains to obtain multiple accumulated column pixel values for each of the one or more finger domains; determining a first maximum accumulated pixel value from a plurality of first accumulated pixel values comprising the multiple accumulated row pixel values for each of the one or more finger domains; determining a second maximum accumulated pixel value from a plurality of second accumulated pixel values comprising the multiple accumulated column pixel values for each of the one or more finger domains; and determining the central coordinate of the gesture in the first gesture image based on a row corresponding to the first maximum accumulated pixel value and a column corresponding to the second maximum accumulated pixel value. Optionally, caching the data of the one or more finger domains in the memory includes caching the data of selected rows of the one or more finger domains.

In some embodiments, the computer-readable instructions are executable by a processor to further cause the processor to perform cropping the first gesture image to a first size to obtain a second gesture image, the first gesture image and the second gesture image being color images; performing gradation conversion on the second gesture image to obtain a first grayscale gesture image; filtering the first grayscale gesture image to obtain a second grayscale gesture image; determining pixel values of pixels in the second grayscale gesture image; comparing a pixel value of each pixel in the second grayscale gesture image with a threshold pixel value; assigning pixels having pixel values greater than or equal to the threshold pixel value as a plurality of first pixels, each of which assigned a first pixel value, and pixels having pixel values less than the threshold pixel value as a plurality of second pixels, each of which assigned a second pixel value, thereby obtaining an intermediate binary image; and performing a boundary erosion and expansion operation on the intermediate binary image thereby obtaining the binary image of the gesture.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for controlling a terminal apparatus, comprising:
   acquiring a first gesture image;
   determining a central coordinate of a gesture in the first gesture image;
   determining an image object from multiple image objects displayed on the terminal apparatus as a control object;
   determining a controlling range in which the gesture has control over the control object, based on the central coordinate of the gesture in the first gesture image;
   determining a control instruction corresponding to the gesture based on relationships between controlling instructions and respective gestures; and
   controlling the control object in the controlling range to execute an operation based on the control instruction;
   wherein the central coordinate of the gesture in the first gesture image is set as a center of a circle or an ellipse in the first gesture image, which is set as the controlling range.

2. The method of claim 1, wherein determining the central coordinate of the gesture in the first gesture image comprises:
   processing the first gesture image to obtain a binary image of the gesture; and
   determining the central coordinate of the gesture in the first gesture image based on edge pixels of a gesture edge in the binary image.

3. The method of claim 2, wherein determining the central coordinate of the gesture in the first gesture image based on edge pixels of the gesture edge in the binary image comprises:
   extracting a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and one of the plurality of first rows of pixels that is immediately adjacent to the initial row of pixel; and
   fitting the initial edge pixel and the plurality of first edge pixels to derive the central coordinate of the gesture in the first gesture image.

4. The method of claim 3, prior to determining the central coordinate of the gesture in the first gesture image based on edge pixels of the gesture edge in the binary image, further comprising:
   recognizing a first connected domain in the binary image; and
   determining edge pixels of the first connected domain;
   wherein the edge pixels of the first connected domain are used as the edge pixels of the gesture edge for determining the central coordinate of the gesture in the first gesture image.

5. The method of claim 4, wherein recognizing the first connected domain in the binary image comprises:
   evaluating whether a present pixel is an edge pixel for pixels in the binary image one-by-one until all edge pixels in the binary image are identified;
   recognizing one or more second connected domains based on a plurality of consecutively connected edge pixels from the edge pixels recognized in the binary image; and
   assigning a connected domain having a largest area out of the one or more second connected domains as the first connected domain for determining the central coordinate of the gesture in the first gesture image.

6. The method of claim 5, wherein evaluating whether the present pixel is the edge pixel comprises:
   acquiring pixel values of a plurality of pixels adjacent to the present pixel; and
   determining whether the present pixel is the edge pixel based on the pixel values of the plurality of pixels adjacent to the present pixel;
   wherein the present pixel is determined not to be the edge pixel if each of the pixel values of the plurality of pixels adjacent to the present pixel is a first pixel value; and
   the present pixel is determined to be the edge pixel if at least one of the pixel values of the plurality of pixels adjacent to the present pixel is not the first pixel value.

7. The method of claim 2, prior to determining the central coordinate of the gesture in the first gesture image, further comprising:
   scanning the binary image to identify one or more noise rows from a plurality of rows of pixels; and
   deleting the one or more noise rows from the binary image.

8. The method of claim 7, wherein scanning the binary image to identify the one or more noise rows from the plurality of rows of pixels comprises:
   scanning the binary image extract a plurality of first pixels in the binary image, each of which has a first pixel value;
   polling a total number of first pixels of the plurality of first pixels in a present row of the plurality of rows of pixels, based on positions of the plurality of first pixels in the binary image; and
   assigning the present row of the plurality of rows of pixels as a noise row of the one or more noise rows based on a determination that the total number of first pixels of the plurality of first pixels in the present row of the plurality of rows of pixels is less than a threshold value.

9. The method of claim 1, wherein determining the central coordinate of the gesture in the first gesture image comprises:

processing the first gesture image to obtain a binary image of the gesture;

recognizing one or more finger domains in the binary image, and caching data of the one or more finger domains in a memory; and determining the central coordinate of the gesture in the first gesture image based on the one or more finger domains.

10. The method of claim 9, wherein determining the central coordinate of the gesture in the first gesture image based on the one or more finger domains comprises:

accumulating pixel values of each row of pixels in each of the one or more finger domains to obtain multiple accumulated row pixel values for each of the one or more finger domains;

accumulating pixel values of each column of pixels in each of the one or more finger domains to obtain multiple accumulated column pixel values for each of the one or more finger domains;

determining a first maximum accumulated pixel value from a plurality of first accumulated pixel values comprising the multiple accumulated row pixel values for each of the one or more finger domains;

determining a second maximum accumulated pixel value from a plurality of second accumulated pixel values comprising the multiple accumulated column pixel values for each of the one or more finger domains; and determining the central coordinate of the gesture in the first gesture image based on a row corresponding to the first maximum accumulated pixel value and a column corresponding to the second maximum accumulated pixel value.

11. The method of claim 9, wherein caching the data of the one or more finger domains in the memory comprises caching data of selected rows of the one or more finger domains.

12. The method of claim 2, wherein processing the first gesture image to obtain the binary image of the gesture comprises:

cropping the first gesture image to a first size to obtain a second gesture image, the first gesture image and the second gesture image being color images;

performing gradation conversion on the second gesture image to obtain a first grayscale gesture image;

filtering the first grayscale gesture image to obtain a second grayscale gesture image;

determining pixel values of pixels in the second grayscale gesture image;

comparing a pixel value of each pixel in the second grayscale gesture image with a threshold pixel value;

assigning pixels having pixel values greater than or equal to the threshold pixel value as a plurality of first pixels, each of which assigned a first pixel value, and pixels having pixel values less than the threshold pixel value as a plurality of second pixels, each of which assigned a second pixel value, thereby obtaining an intermediate binary image; and performing a boundary erosion and expansion operation on the intermediate binary image thereby obtaining the binary image of the gesture.

13. An apparatus for controlling a terminal apparatus, comprising:

a memory; and one or more processors;

wherein the memory and the one or more processors are connected with each other; and the memory stores computer-executable instructions for controlling the one or more processors to:

acquire a first gesture image;

determine a central coordinate of a gesture in the first gesture image;

determine an image object from multiple image objects displayed on the terminal apparatus as a control object determine a controlling range in which the gesture has control over the control object, based on the central coordinate of the gesture in the first gesture image;

determine a control instruction corresponding to the gesture based on relationships between controlling instructions and respective gestures; and control the control object in the controlling range to execute an operation based on the control instruction;

wherein the central coordinate of the gesture in the first gesture image is set as a center of a circle or an ellipse in the first gesture image, which is set as the controlling range.

14. The apparatus of claim 13, wherein the memory further stores computer-executable instructions for controlling the one or more processors to:

process the first gesture image to obtain a binary image of the gesture; and determine the central coordinate of the gesture in the first gesture image based on edge pixels of a gesture edge in the binary image.

15. The apparatus of claim 14, wherein the memory further stores computer-executable instructions for controlling the one or more processors to:

extract a plurality of first edge pixels from a plurality of first rows of pixels in the binary image based on an initial edge pixel from an initial row of pixels in the binary image, any two directly adjacent rows of the plurality of first rows of pixels are spaced apart by a same distance as a distance between the initial row of pixel and one of the plurality of first rows of pixels that is immediately adjacent to the initial row of pixel; and fit the initial edge pixel and the plurality of first edge pixels to derive the central coordinate of the gesture in the first gesture image.

16. The apparatus of claim 15, wherein the memory further stores computer-executable instructions for controlling the one or more processors to:

recognize a first connected domain in the binary image; and determine edge pixels of the first connected domain;

wherein the edge pixels of the first connected domain are used as the edge pixels of the gesture edge for determining the central coordinate of the gesture in the first gesture image.

17. The apparatus of claim 16, wherein the memory further stores computer-executable instructions for controlling the one or more processors to:

evaluate whether a present pixel is an edge pixel for pixels in the binary image one-by-one until all edge pixels in the binary image are identified;

recognize one or more second connected domains based on a plurality of consecutively connected edge pixels from the edge pixels recognized in the binary image; and assign a connected domain having a largest area out of the one or more second connected domains as the first connected domain for determining the central coordinate of the gesture in the first gesture image.

18. The apparatus of claim 17, wherein the memory further stores computer-executable instructions for controlling the one or more processors to:

acquire pixel values of a plurality of pixels adjacent to the present pixel; and determine whether the present pixel is the edge pixel based on the pixel values of the plurality of pixels adjacent to the present pixel;

wherein the present pixel is determined not to be the edge pixel if each of the pixel values of the plurality of pixels adjacent to the present pixel is a first pixel value; and the present pixel is determined to be the edge pixel if at least one of the pixel values of the plurality of pixels adjacent to the present pixel is not the first pixel value.

19. The apparatus for controlling a terminal apparatus of claim 13, further comprising a camera configured to capture the first gesture image.

20. A computer-program product comprising a non-transitory tangible computer-readable medium having computer-readable instructions thereon, the computer-readable instructions being executable by a processor to cause the processor to perform:

acquiring a first gesture image;

determining a central coordinate of a gesture in the first gesture image;

determining an image object from multiple image objects displayed on a terminal apparatus as a control object;

determining a controlling range in which the gesture has control over the control object, based on the central coordinate of the gesture in the first gesture image; and determining a control instruction corresponding to the gesture based on relationships between controlling instructions and respective gestures; and controlling the control object in the controlling range to execute an operation based on the control instruction;

wherein the central coordinate of the gesture in the first gesture image is set as a center of a circle or an ellipse in the first gesture image, which is set as the controlling range.

* * * * *